W. H. MARDEN & C. C. WEAVER.
STUFFING BOX.
APPLICATION FILED MAY 8, 1912.
1,052,357.
Patented Feb. 4, 1913.
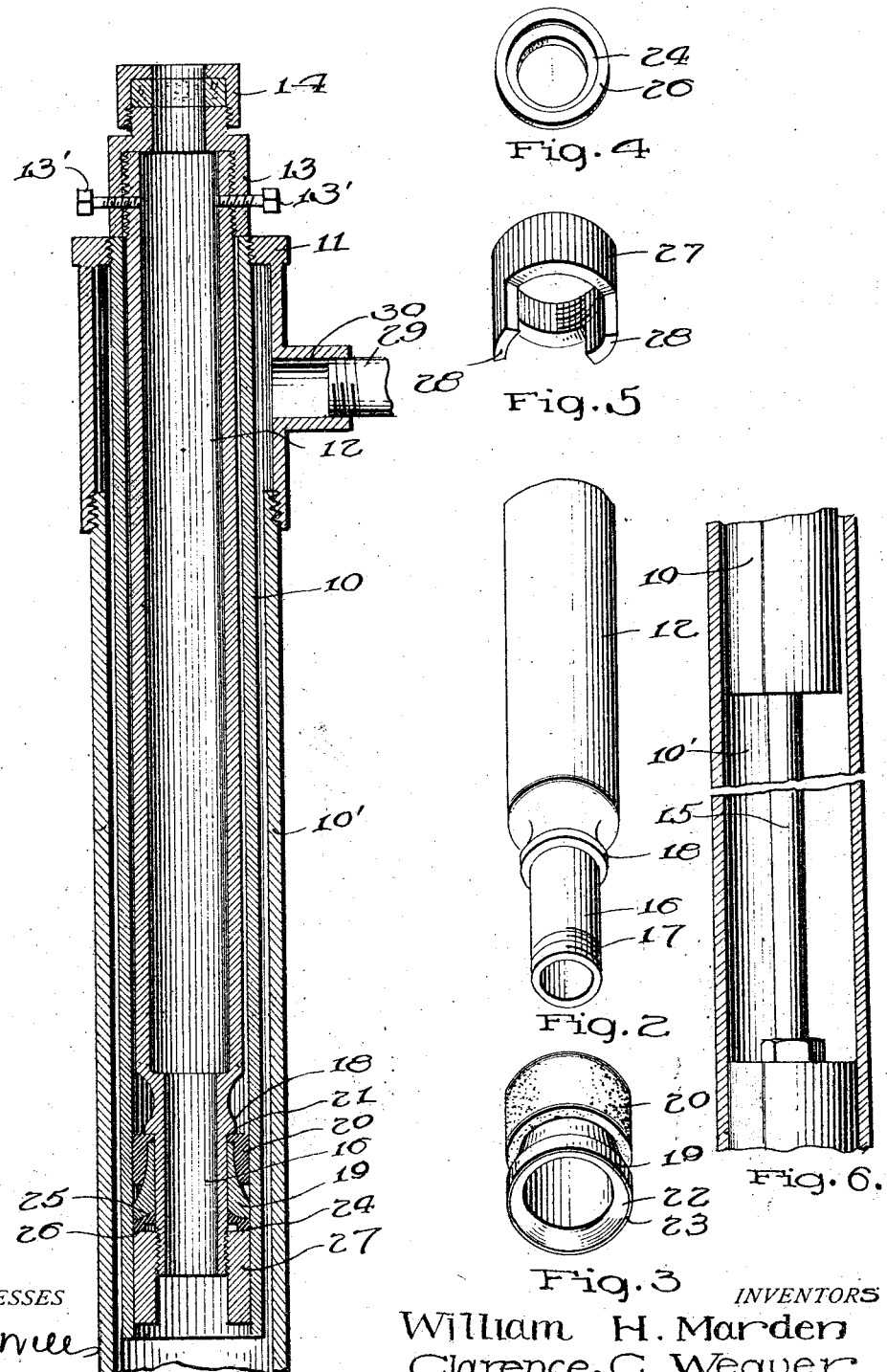
WITNESSES
INVENTORS
William H. Marden
Clarence C. Weaver
By C. C. Vrooman,
His Attorney

UNITED STATES PATENT OFFICE.

WILLIAM H. MARDEN AND CLARENCE C. WEAVER, OF SAPULPA, OKLAHOMA.

STUFFING-BOX.

1,052,357.

Specification of Letters Patent.

Patented Feb. 4, 1913.

Application filed May 8, 1912. Serial No. 696,009.

*To all whom it may concern:*

Be it known that we, WILLIAM H. MARDEN and CLARENCE C. WEAVER, citizens of the United States, residing at Sapulpa, in the county of Creek and State of Oklahoma, have invented certain new and useful Improvements in Stuffing-Boxes, of which the following is a specification, reference being had therein to the accompanying drawing.

This invention relates to a stuffing box which is used in connection with an oil well.

The principal object of the invention is to provide an improved type of stuffing box which is so formed that it may be easily and quickly assembled and which will operate very efficiently when in use. This device comprises in brief a hollow shaft having a reduced end upon which there is mounted a series of cups preferably formed of leather, the cups being held in place by metallic sleeves, the outer one of which is threaded upon the end of the shaft.

This invention is illustrated in the accompanying drawings, wherein:—

Figure 1 is a vertical sectional view through the device. Fig. 2 is a perspective view of the end of the shaft. Fig. 3 is a perspective view of the metallic sleeve which fits upon the end of the shaft and carries leather cups. Fig. 4 is a perspective view of the cup which fits upon the shaft beneath the sleeve shown in Fig. 3. Fig. 5 is a perspective view of the clamping nut which holds the cup shown in Fig. 4, and the device shown in Fig. 3 in place. Fig. 6 is a view of the lower portion of the well.

Referring to the accompanying drawings, it will be seen that this device is intended to be used in connection with oil wells in which a metallic pipe 10 is positioned in the tube 10 and held in place by means of a bushing 11 which is threaded upon the outer end of the pipe 10, and upon the outer end of the tube 10. The invention comprises a metallic shaft 12 which is hollow and fits into the pipe 10. A collar 13 is threaded upon the outer end portion of the shaft 12, and has its outer end portion reduced and provided so that a sleeve 14, which is mounted upon the pump rod 15 may be connected with the collar 13. Set screws 16 pass through the collar 13, and pipe 10 and engage the pump rod 15 to connect the pipe 10 with the pump rod.

The upper end portion 17 of the shaft 12 is reduced and has a said portion 17 threaded, an abutment shoulder 18 being formed at the upper end of the reduced portion of the shaft 12. A tapering sleeve 19 is fitted upon the reduced end of the shaft 12 and carries a leather cup 20 which has an inwardly extending flange 21 at its upper end, the flange being positioned between the abutment 18, and the end of the sleeve 19. The lower edge face of the sleeve 19 has its central portion 22 concave thus leaving a rim 23 at the outer edge portion. A leather cup 24 is placed upon the shaft and is provided with a tapering central portion 25 which conforms to the contour of the central portion 22 of the sleeve 19. A rim is formed upon the lower face of the washer and forms a bearing against which the clamping nut 27 fits. This clamping nut 27 is provided with a concave inner edge bearing against the washer 24 so that the washer is tightly gripped thus preventing any danger of its slipping out. Lugs 28 extend from the clamp 27 by means of which the clamp is tightly screwed upon the threaded end 17 of the shaft 12. When in operation, the shaft 12 is moved vertically in the pipe 10 with the pump rod 15, thus forcing the oil on the outside of the pipe 10 and out through the tubing, into the lead pipe 29 which is connected with the arm 30 and leads to the storage tanks.

What is claimed is:—

1. In a device of the class described a shaft having a reduced inner end, the reduced inner end having a threaded end portion and provided with an abutment shoulder at its upper end, a tapering sleeve mounted upon said reduced end portion, a packing ring mounted upon said sleeve and provided with an inwardly extending flange positioned between the end of said sleeve and said abutment shoulder, said sleeve being provided with a concaved inner edge portion forming a central seat, a packing washer fitting against the inner edge of said sleeve and provided with a thickened central portion fitting into the seat formed in the edge of said sleeve, the edge portion of said washer being thickened to form a bearing ring, and a clamping nut screwed upon the threaded end of said shaft and holding said washer and sleeve in place.

2. A shaft having a reduced inner end portion having its end portion threaded, an abutment shoulder formed upon the reduced end of said shaft, a sleeve mounted upon the reduced end of said shaft, a packing ring mounted upon said sleeve and provided with an inwardly extending flange fitting between the end of said sleeve and said abutment shoulder, a packing washer fitting upon the reduced end of said shaft and against the end of said sleeve, the edge portion of said washer being thickened to form an abutment ring, and a clamping nut screwed upon the threaded end of said shaft and bearing against the thickened edge portion of said washer.

In testimony whereof we hereunto affix our signatures in presence of two witnesses.

WILLIAM H. MARDEN.
CLARENCE C. WEAVER.

Witnesses:
A. W. MARKS,
TYLER BREWER.